US008785872B1

(12) United States Patent
Roos

(10) Patent No.: US 8,785,872 B1
(45) Date of Patent: Jul. 22, 2014

(54) IMAGING METHOD AND SYSTEM

(71) Applicant: Varian Medical Systems, Inc., Palo Alto, CA (US)

(72) Inventor: Pieter Gerhard Roos, Sandy, UT (US)

(73) Assignee: Varian Medical Systems, Inc., Palo Alto, CA (US)

( * ) Notice: Subject to any disclaimer, the term of this patent is extended or adjusted under 35 U.S.C. 154(b) by 0 days.

(21) Appl. No.: 13/831,853

(22) Filed: Mar. 15, 2013

(51) Int. Cl.
*H01L 27/146* (2006.01)

(52) U.S. Cl.
USPC ............................................. 250/370.09

(58) Field of Classification Search
USPC .................. 250/370.01–370.15; 378/98.8
See application file for complete search history.

(56) References Cited

U.S. PATENT DOCUMENTS

| | | | | |
|---|---|---|---|---|
| 6,747,695 | B1 * | 6/2004 | Afghahi | 348/241 |
| 7,634,061 | B1 * | 12/2009 | Tumer et al. | 378/98.9 |
| 7,688,947 | B2 * | 3/2010 | Mollov et al. | 378/98.8 |
| 7,750,309 | B2 * | 7/2010 | Endo et al. | 250/370.09 |

OTHER PUBLICATIONS

Boyd Fowler et al., "Reset Noise Reduction in Capacitive Sensors", IEEE Transactions on Circuits and Systems—I: Regular Papers, Aug. 2006, pp. 1658-1669, vol. 53, No. 8.
David G. Mavis et al., "Employing Radiation Hardness by Design Techniques with Commercial Integrated Circuit Processes", Digital Avionics Systems Conference, Oct. 1997, pp. 15-22, vol. 1.

* cited by examiner

*Primary Examiner* — Kiho Kim
(74) *Attorney, Agent, or Firm* — SU IP Consulting

(57) ABSTRACT

An example imaging system including a detector, a transconductance amplifier, a charge integrator, and a current mirror is disclosed. The detector is coupled to a first current and configured to accumulate charges in response to light or radiation. The transconductance amplifier is configured to receive a pixel voltage of the detector and generate a second current according to the pixel voltage, wherein the pixel voltage is associated with the accumulated charges and the first current. The charge integrator is configured to generate an output signal according to a third current. The current mirror is configured to generate the first current and the third current according to the second current so that the first current gradually decreases as the pixel voltage approaches a reference voltage.

12 Claims, 6 Drawing Sheets

IMAGING METHOD AND SYSTEM

BACKGROUND

Unless otherwise indicated herein, the approaches described in this section are not prior art to the claims in this application and are not admitted to be prior art by inclusion in this section.

Various techniques have been developed for obtaining digital X-ray and gamma ray images of an object for purposes such as X-ray diagnostics, medical radiology, non-destructive testing, and so on. In one conventional approach, a flat-panel, two-dimensional, digital X-ray imager may include a plurality of active or passive detecting pixels formed on a silicon substrate. Each of such detecting pixels may consist of a photodiode and a plurality switches for resetting and selecting the photodiode. The active detecting pixel may further include an active element, such as a buffer amplifier of high input impedance and low output impedance. The use of active elements enables image production from very low light sources, but disadvantageously requires larger physical size and more complicated manufacturing processes.

In addition to structural differences, a passive X-ray imager is configured to measure the charges stored in the pixel directly, while an active X-ray imager is configured to measure the voltages across the pixel and calculate the charges stored in the pixel based on Coulomb's law (Q=CV). Since the photodiode and the switches also contribute to pixel capacitance, the measured pixel voltages may have a non-linear relationship with the amount of charges stored in the pixel during exposure in the active X-ray imager.

In a prior art imaging system, the pixel voltages may be reset by draining charges from the pixel through a semiconductor switch. The eventual level to which the pixel may reset to may vary due to thermal noises generated by the turn-on resistance of the semiconductor switch. The effect is called kTC noise and poses a fundamental limit to the sensitivity of the imaging system since the uncertainty of this reset level in the current readout period results in noises in the subsequent readout period. Therefore, there is a need for an imaging system which provides good low-signal sensitivity (particularly when adapted as a passive X-ray imager), good linearity (particularly when adapted as an active X-ray imager), and high sensitivity by reducing kTC noises.

SUMMARY

In at least some embodiments of the present disclosure, an imaging system includes a detector, a transconductance amplifier, a charge integrator, and a current mirror. The detector is coupled to a first current and configured to accumulate charges in response to light or radiation. The transconductance amplifier is configured to receive a pixel voltage of the detector and generate a second current according to the pixel voltage, wherein the pixel voltage is associated with the accumulated charges and the first current. The charge integrator is configured to generate an output signal according to a third current. The current mirror is configured to generate the first current and the third current according to the second current, so that the first current gradually decreases as the pixel voltage approaches a reference voltage.

In at least some embodiments of the present disclosure, an imaging method includes storing data representative of an amount of light or radiation in a detector, detecting a pixel voltage of the detector, generating a first current according to a difference between the pixel voltage and a reference voltage, generating a second current according to the first current for charging the pixel, wherein the first current gradually decreases as the pixel voltage approaches the reference voltage, generating a third current by amplifying the first current, and generating an output signal according to the third current.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
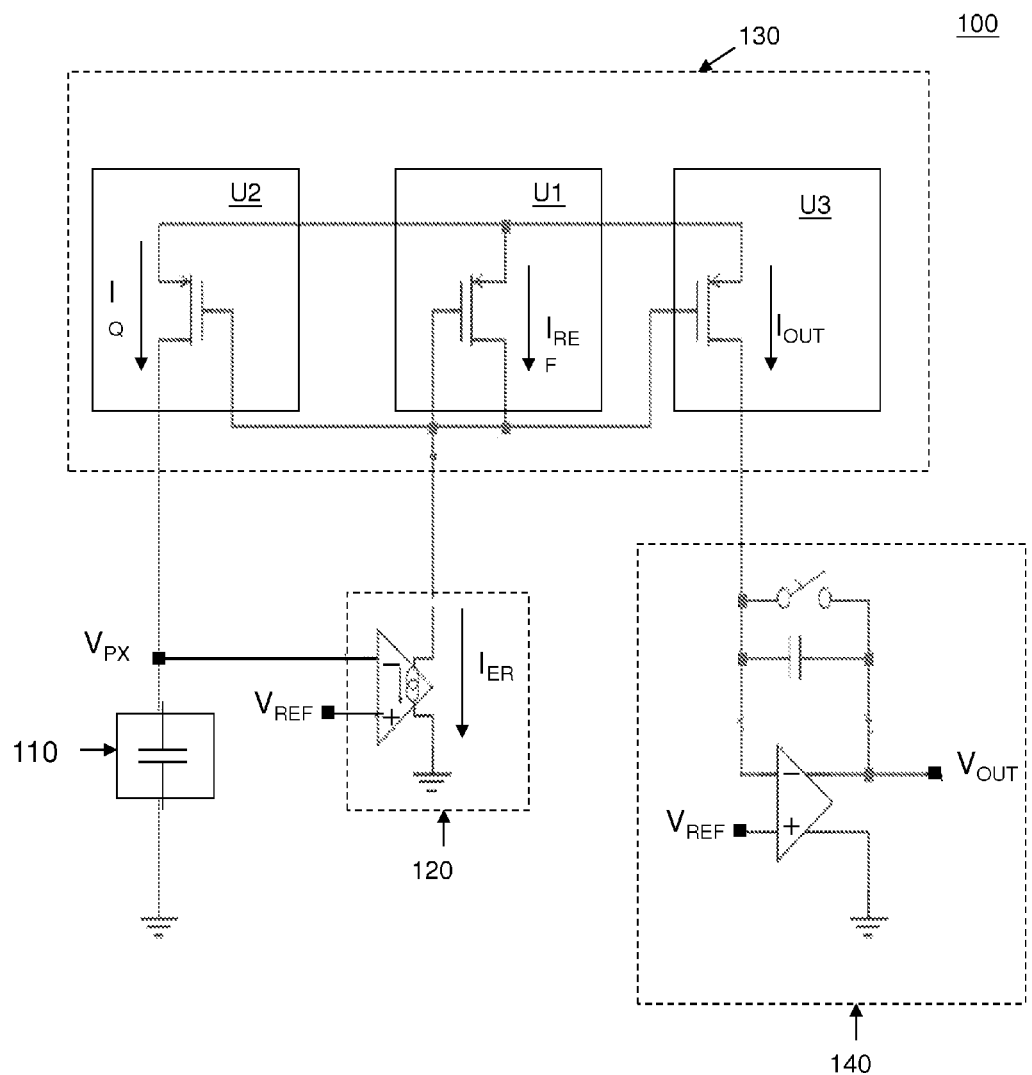
FIG. 1 is an example embodiment of an imaging system for obtaining X-ray images.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein. The mirror image nature of pixels in adjacent columns are artifacts of the drawing style and may not be material to the present disclosure. Pixels in adjacent columns may be identical or the layout may be tailored to ease design of the matrix.

FIG. 1 is an example embodiment of an imaging system 100 for obtaining X-ray images in accordance with at least some embodiments of the present disclosure. In FIG. 1, the imaging system 100 is in a basic configuration and may include a detector 110, a transconductance amplifier 120, a current mirror 130, and a charge integrator 140.

The detector 110 may include a plurality of pixels arranged in a matrix and configured to accumulate charges in response to light or radiation. The detector 110 may adopt active-type or passive-type pixels each including, but not limited to, a photodiode, a storage capacitor, one or multiple switches, and/or an active element. In the basic configuration of the imaging system 100 as shown in FIG. 1, only one pixel capacitor is depicted and $V_{PX}$ represents the corresponding pixel voltage.

The transconductance amplifier 120 may be an error amplifier characterized by a voltage-to-current conversion ratio and having a positive input end coupled to a reference voltage $V_{REF}$ and a negative input end coupled to the pixel voltage $V_{PX}$. The reference voltage $V_{REF}$ is set to a pre-exposure voltage of the pixel before photo current is induced by light or radiation. The transconductance amplifier 120 is configured to generate an error current $I_{ER}$ proportional to the difference between the reference voltage $V_{REF}$ and the pixel voltage $V_{PX}$ at an output end.

The current mirror 130 is a dual-output circuit which includes a reference unit U1 having a current gain M1, a charging unit U2 having a current gain M2, and an output unit U3 having a current gain M3. The reference unit U1 is coupled to the output end of the transconductance amplifier 120 and may be configured to generate a reference current $I_{REF}$ which is a replicate of the error current $I_{ER}$. The charging unit U2 is coupled to the detector 110 and may be configured to supply a charging current $I_Q$ by mirroring the reference current $I_{REF}$. The output unit U3 is coupled to the charge integrator 140 and may be configured to supply an output current $L_{OUT}$ by mirroring the reference current $I_{REF}$. The charging current $I_Q$ is equal to (M2/M1) times reference current $I_{REF}$. The output current $I_{OUT}$ is equal to (M3/M1) times the reference current $I_{REF}$ or (M3/M2) times the charging current $I_Q$.

In an embodiment, the current mirror 130 may be implemented using different switching devices in order to achieve M2<M1<M3. Therefore, the output current $I_{OUT}$ may be larger than the charging current $I_Q$. The current mirror 130 may adopt switching devices including, but not limited to, bipolar transistors (BJTs) or metal-oxide-semiconductor field-effect transistors (MOSFETs). The current mirror 130 illustrated in FIG. 1 is in a most basic form using p-type MOSFETS, but does not limit the scope of the present disclosure.

The charge integrator 140 is a charge-to-voltage convertor, having a positive input end coupled to the reference voltage $V_{REF}$ and a negative input end coupled to the output unit U3 of the current mirror 130, is configured to generate an output signal $V_{OUT}$ according to the accumulated charge of the output current $I_{OUT}$ during a readout period. The charge integrator 140 illustrated in FIG. 1 is in a most basic form using an operational amplifier, a capacitor and a reset switch, but does not limit the scope of the present disclosure.

For illustrating the operation of the imaging system 100, it is assumed that a signal charge packet has been stored in a pixel of the detector 110 before the readout sequence. The polarity of the signal charge packet may be chosen so that the exposure of the pixel induces a current which drains charges from the pixel and depletes the pixel voltage $V_{PX}$. Similar concept may be adopted for other polarities of the signal charge packet.

At the start of a readout period when the pixel voltage $V_{PX}$ presented to the transconductance amplifier 120 does not match the reference voltage $V_{REF}$, the transconductance amplifier 120 is configured to draw the error current $I_{ER}$ from the current mirror 130. Functioning as a unit-gain amplifier, the reference unit U1 is configured to supply the reference current $I_{REF}$ ($I_{REF}=I_{ER}$), which may then be mirrored by the charging unit U2 to generate the charging current $I_Q$ and mirrored by the output unit U3 to generate the output current $I_{OUT}$. The charging current $I_Q$ may provide the charge required for resetting the pixel voltage $V_{PX}$ to the pre-exposure level equal to the reference voltage $V_{PX}$ at the end of the readout period. The charge of the output current $I_{OUT}$ may be accumulated and stored in the capacitor of the charge integrator 140. As the pixel voltage $V_{PX}$ gradually increases in response to the charging current $I_Q$, which in turn gradually decreases as the difference between the reference voltage $V_{REF}$ and the pixel voltage $V_{PX}$ approaches zero. At the time when the pixel voltage $V_{PX}$ reaches the reference voltage $V_{REF}$, the error current $I_{ER}$, the charging current $I_Q$ and the output current $I_{OUT}$ all cease flowing. The charge integrator 140 may thus generate the output signal $V_{OUT}$ according to the charge stored in its capacitor.

In the imaging system 100 according to the present disclosure, a precise feedback scheme is provided in which the charging current $I_Q$ is proportional to the difference between the pixel voltage $V_{PX}$ and the reference voltage $V_{REF}$. The imaging system 100 is characterized by resetting the pixels of the detector 110 using the gradually decreasing charging current $I_Q$. The pixel voltage $V_{PX}$ may approach the reference voltage $V_{REF}$ asymptotically and the charging current $I_Q$ may approach zero asymptotically. The gradually decreasing charging current $I_Q$ may reduce kTC noise to a level lower than achievable by normal reset using a switch. The precise feedback scheme may minimize the uncertainty in pixel reset voltage, thereby improving the sensitivity of the imaging system 100.

In the imaging system 100 according to the present disclosure, the charge integrator 140 is configured to measure the actual amount of charge required to recharge the pixel PX to its pre-exposure voltage level ($V_{REF}$) directly and generate the output voltage $V_{OUT}$ accordingly. The amount of charge stored in the charge integrator 140 during each readout period is (M3/M2) times the amount of charge drained from the pixel during each image exposure. This kind of charge amplification allows the imaging system 100 to produce images from very low light sources, thereby improving sensitivity, in particular, when implemented as a passive X-ray imager. Meanwhile, since the output voltage $V_{OUT}$ is a linear function of the integrated light exposure to the pixel and independent of the pixel voltage, the imaging system 100 may provide superior linearity performance, in particular, when implemented as an active X-ray imager.

Figure 2:
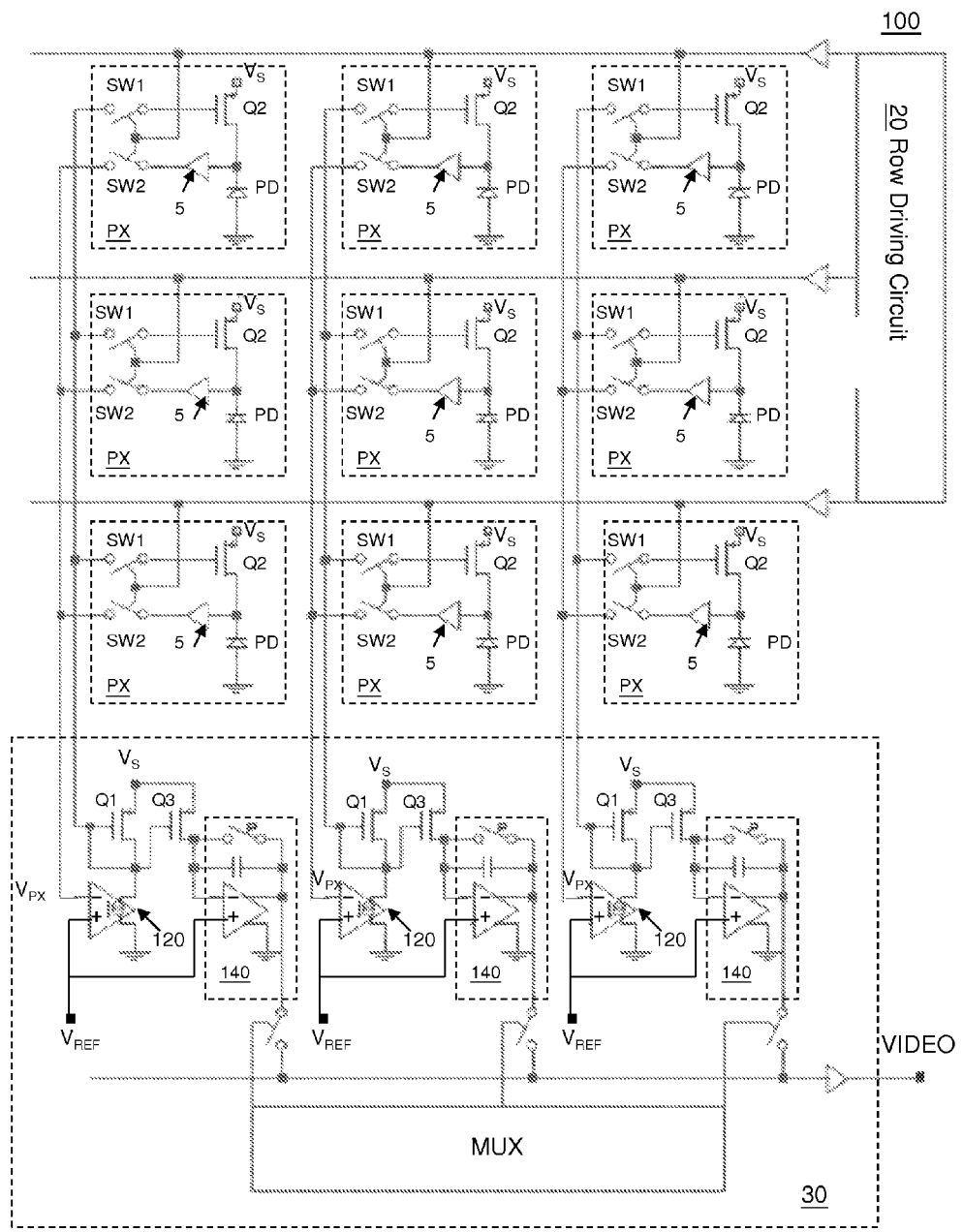
FIGS. 2-3 are example embodiments of an X-ray matrix imager.
Figure 3:
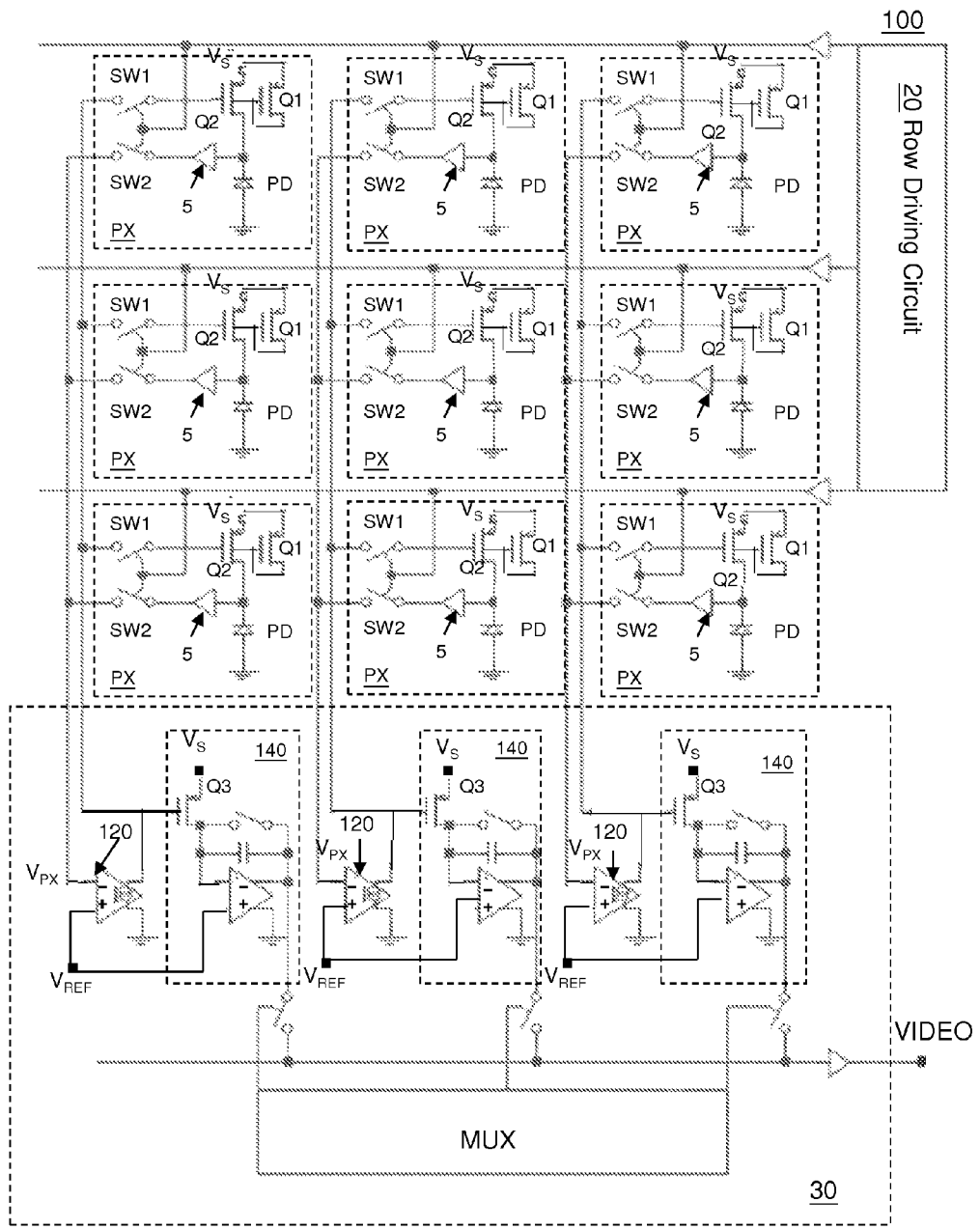

FIGS. 2 and 3 are example embodiments of the imaging system 100 adapted to achieve an X-ray matrix imager. In the imaging system 100 illustrated in FIGS. 2 and 3, the detector 110 may include an M by N pixel matrix having M columns and N rows (M and N are positive integers). The M by N pixel matrix may include a plurality of pixels PX configured to accumulate charges in response to light or radiation. FIGS. 2 and 3 depict a configuration when M=N=3. In one embodiment, each pixel PX may include, but not limited to, a photodiode and a semiconductor switch, such as MOSFET, thin-film transistor (TFT), or diode. The imaging system 100 further includes a row driving circuit 20 and a readout circuit 30. The row driving circuit 20 is configured to generate select signals for turning on the pixels PX in corresponding matrix rows. Charges accumulated in each selected pixel may then be transferred to the readout circuit 30 during each readout period for acquiring a video signal VIDEO.

In the imaging system 100 illustrated in FIG. 2, the reference unit U1 of the current mirror 130 may be implemented using a grouping of parallel lumped switches Q1 for each matrix column, the charging unit U2 of the current mirror 130 may be implemented using distributed switches Q2 placed at each pixel, and the output unit U3 of the current mirror 130 may be implemented using a grouping of parallel lumped switches Q3 for each matrix column. Each matrix column may be driven by a respective transconductance amplifier 120 and a respective charge integrator 140. Therefore, each pixel PX may include two row selection switches SW1-SW2, a buffer amplifier 5, a photodiode PD and a distributed switch Q2, while the readout circuit 30 may include the transconductance amplifier 120, the charge integrator 140, the lumped switches Q1 and Q3 of the current mirror 130, and a multiplexing circuit MUX. The row selection switches SW1-SW2 are used for selectively connect the pixels PX of each matrix row to the readout circuit 30. The buffer amplifier 5 is used for compensating the capacitive loading presented by inactive pixels PX. The multiplexing circuit MUX is used for selecting the output of each charge integrator 140 in sequence to produce the video signal VIDEO in a required raster pattern.

In the imaging system 100 illustrated in FIG. 3, the reference unit U1 of the current mirror 130 may be implemented using distributed switches Q1 placed at each pixel, the charging unit U2 of the current mirror 130 may be implemented using distributed switches Q2 placed at each pixel, and the output unit U3 of the current mirror 130 may be implemented using a grouping of parallel lumped switches Q3 for each matrix column. Each matrix column may be driven by a respective transconductance amplifier 120 and a respective charge integrator 140. Therefore, each pixel PX may include two row selection switches SW1-SW2, a buffer amplifier 5, a photodiode PD and the distributed switches Q1 and Q2, while the readout circuit 30 may include the transconductance amplifier 120, the charge integrator 140, the lumped switch Q3 of the current mirror 130, and a multiplexing circuit MUX. The row selection switches SW1-SW2 are used for selectively connect the pixels PX of each matrix row to the readout circuit 30. The buffer amplifier 5 is used for compensating the capacitive loading presented by inactive pixels PX. The multiplexing circuit MUX is used for selecting the output of each charge integrator 140 in sequence to produce the video signal VIDEO in a required raster pattern.

Figure 4:
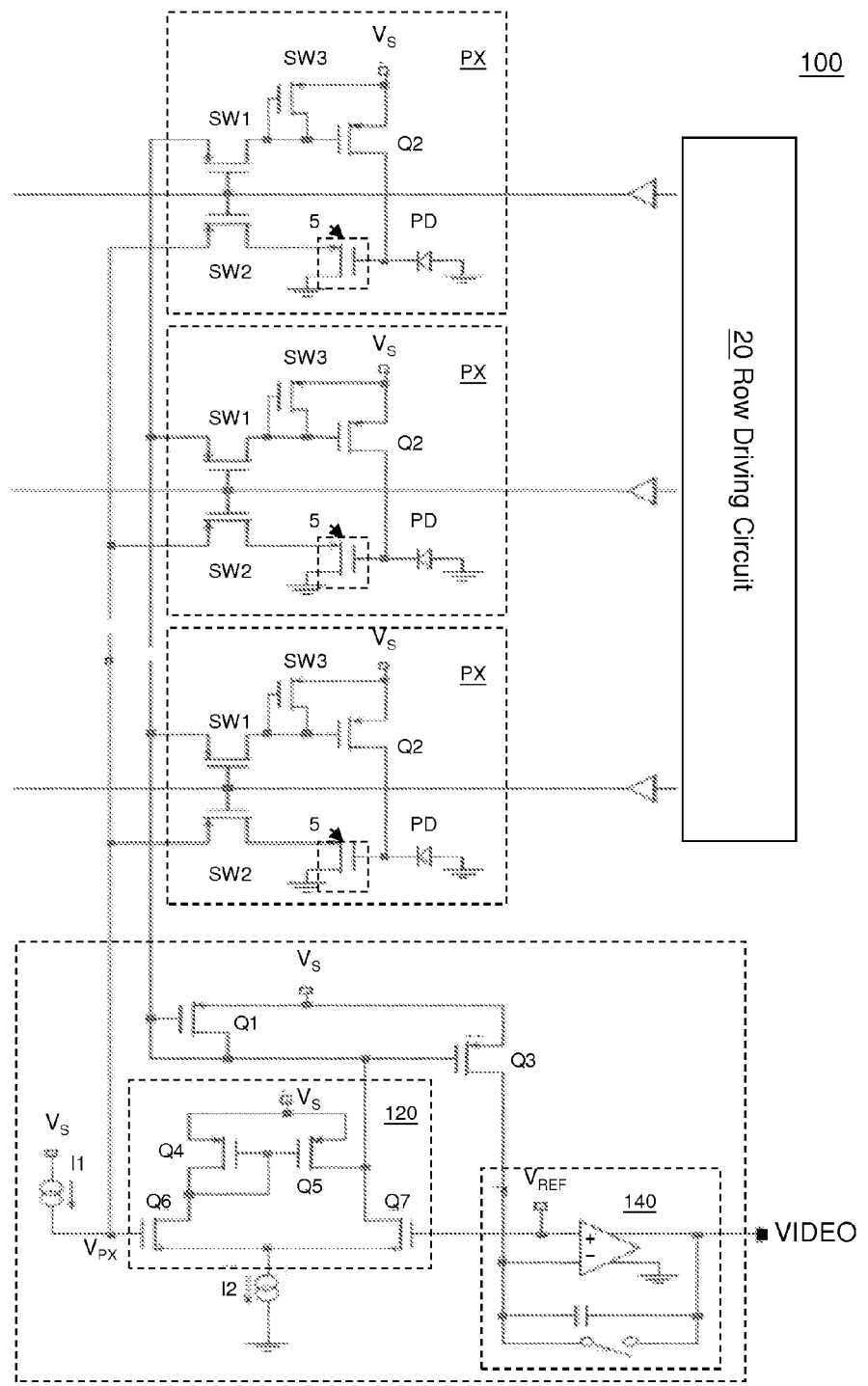
FIGS. 4-6 are example detailed circuit diagrams of the imaging system depicted in FIG. 1, all arranged in accordance with at least some embodiments of the present disclosure.

FIG. 4 is an example detailed circuit diagram of the imaging system 100 depicted in FIG. 2. For illustrative purpose, only one matrix column is depicted. The row selection switches SW1-SW2, the distributed switches Q2 and the lumped switches Q1 and Q3 may be implemented using p-type MOSFET devices. The buffer amplifier 5 may be implemented as a p-type MOSFET source follower amplifier biased by a current source 11 which is communal for the whole matrix column. Each pixel PX further includes a diode-connected p-type MOSFET device SW3 for draining any charge which may build up on the gate of a corresponding de-selected distributed switch Q2, thereby preventing leakage current and spurious switching of the distributed switch Q2. Each column-communal transconductance amplifier 120 may be implemented as a differential pair amplifier having p-type MOSFET devices Q4-Q5 and n-type MOSFET devices Q6-Q7 biased by a current source 12. Meanwhile, the imaging system 100 depicted in FIG. 3 may be implemented in a similar manner as depicted in FIG. 4.

Figure 5:
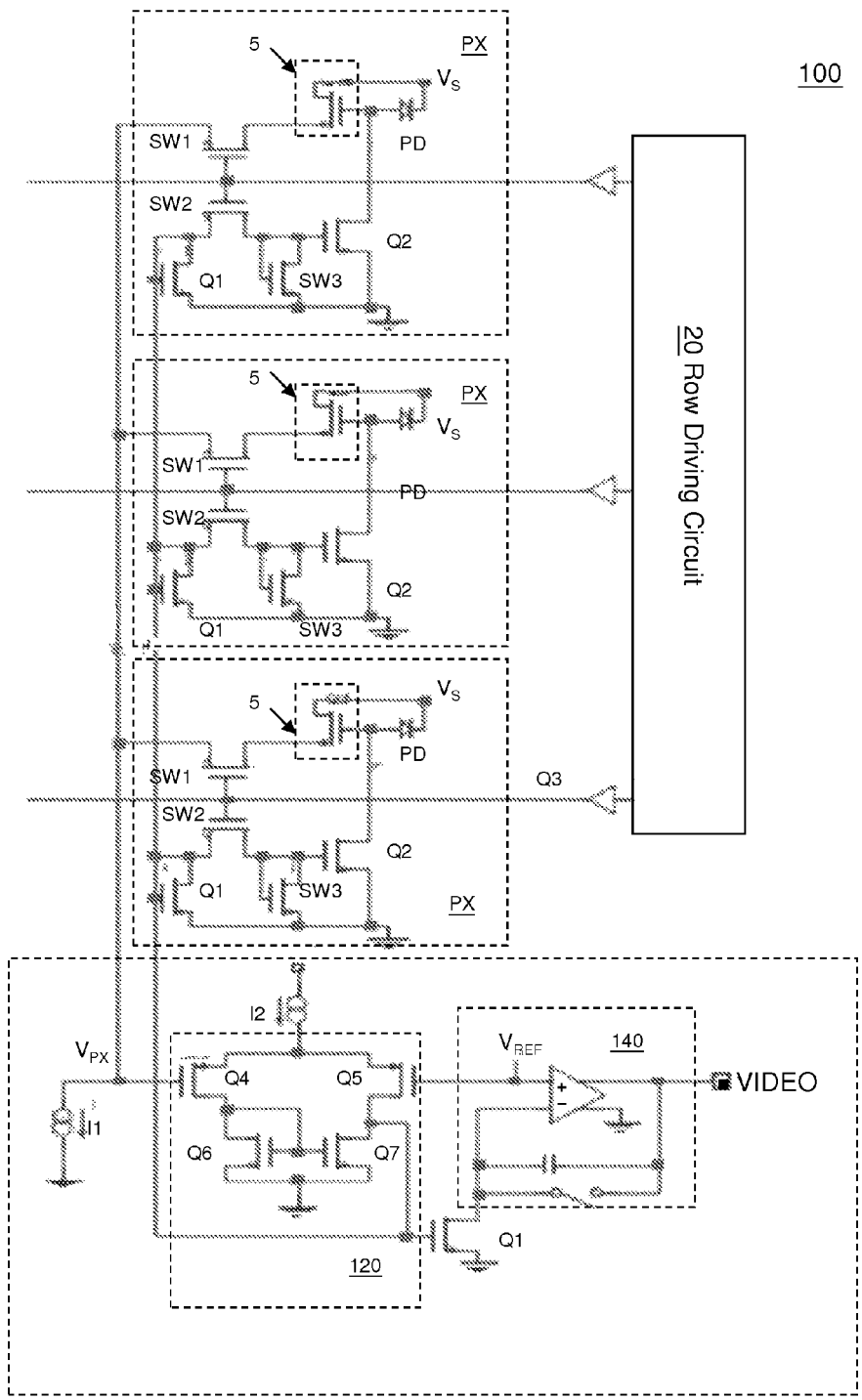

FIG. 5 is an example detailed circuit diagram of the imaging system 100 depicted in FIG. 3. For illustrative purpose, only one matrix column is depicted. The row selection switches SW1-SW2, the distributed switches Q1-Q2 and the lumped switches Q3 may be implemented using n-type MOSFET devices. The buffer amplifier 5 may be implemented as an n-type MOSFET source follower amplifier biased by a current source 11 which is communal for the whole matrix column. Each pixel PX further includes a diode-connected n-type MOSFET device SW3 for draining any charge which may build up on the gate of a corresponding de-selected distributed switch Q2, thereby preventing leakage current and spurious switching of the distributed switch Q2. Each column-communal transconductance amplifier 120 may be implemented as a differential pair amplifier p-type MOSFET devices Q4-Q5 and n-type MOSFET devices Q6-Q7 biased by a current source 12. Meanwhile, the imaging system 100 depicted in FIG. 2 may be in a similar manner as depicted in FIG. 5.

Figure 6:
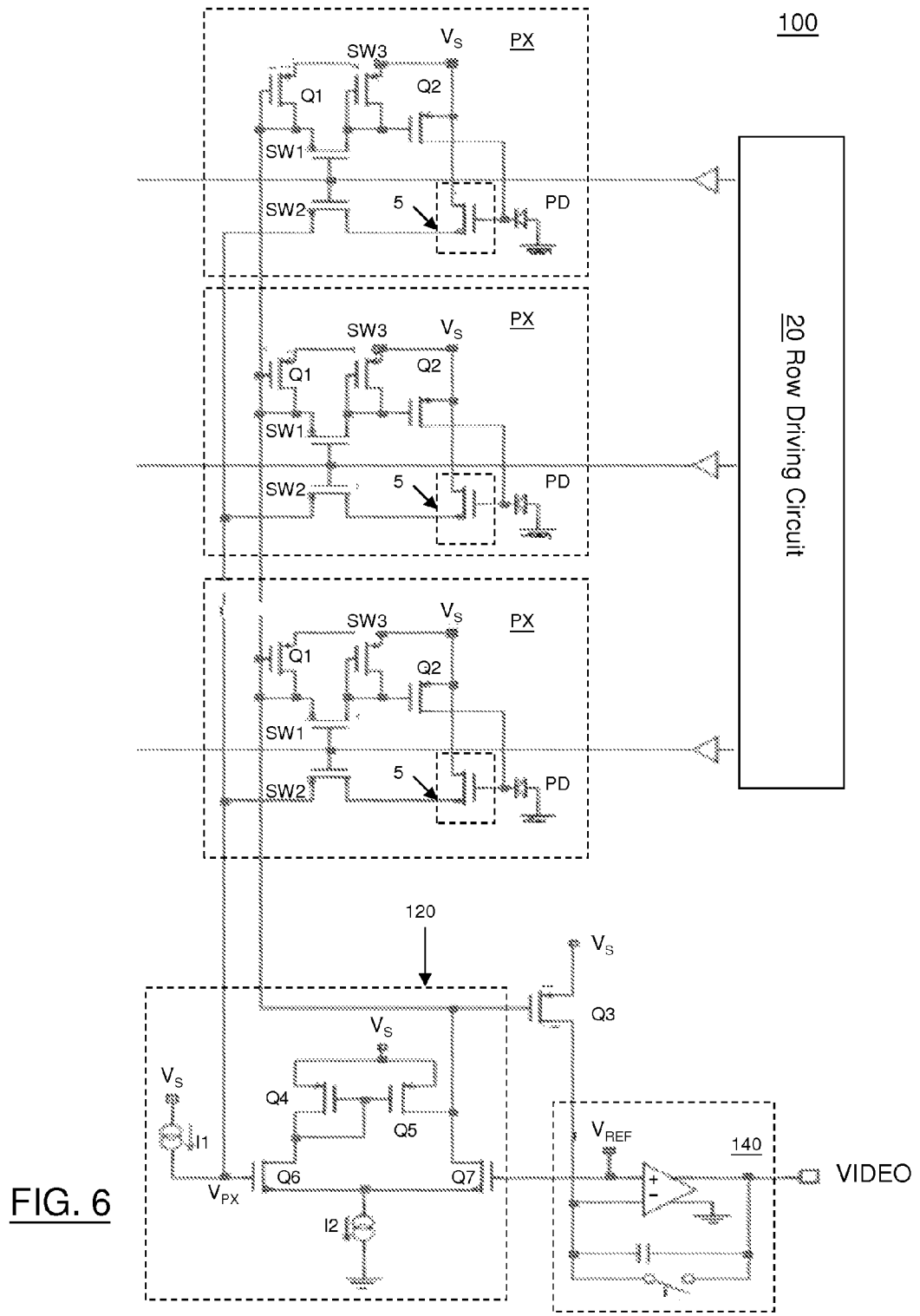

FIG. 6 is an example detailed circuit diagram of the imaging system 100 depicted in FIG. 3. For illustrative purpose, only one matrix column is depicted. The distributed switches Q1-Q2 and the lumped switches Q3 may be implemented as p-type MOSFET devices. The row selection switches SW1-SW2 may be implemented as n-type MOSFET devices. The buffer amplifier 5 may be implemented as an n-type MOSFET source follower amplifier biased by a current source 11 which is communal for the whole matrix column. Each pixel PX further includes a diode-connected p-type MOSFET device SW3 for draining any charge which may build up on the gate of a corresponding de-selected distributed switch Q2, thereby preventing leakage current and spurious switching of the distributed switch Q2. Each column-communal transconductance amplifier 120 may be implemented as a differential pair amplifier having p-type MOSFET devices Q4-Q5 and n-type MOSFET devices Q6-Q7 biased by a current source 12. Meanwhile, the imaging system 100 depicted in FIG. 2 may be implemented in a similar manner as depicted in FIG. 6.

Although the present disclosure has been described with reference to certain example embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense.

I claim:

1. An imaging system, comprising:
a detector coupled to a first current and configured to accumulate charges in response to light or radiation;
a transconductance amplifier configured to:
receive a pixel voltage of the detector; and
generate a second current according to the pixel voltage, wherein the pixel voltage is associated with the accumulated charges and the first current;
a charge integrator configured to generate an output signal according to a third current; and
a current mirror configured to generate the first current and the third current according to the second current so that the first current gradually decreases as the pixel voltage approaches a reference voltage.

2. The imaging system of claim 1, wherein the current mirror further comprises:
a reference unit configured to generate a fourth current which is a replicate of the second current;
a charging unit configured to generate the first current which is proportional the fourth current; and
an output unit configured to generate the third current which is proportional the fourth current.

3. The imaging system of claim 2, wherein:
the charging unit includes a first transistor arranged to provide a first current gain;
the reference unit includes a second transistor arranged to provide a second current gain;
the output unit includes a third transistor arranged to provide a third current gain;
a ratio of the first current to the fourth current is equal to a ratio of the first current gain to the second current gain; and
a ratio of the third current to the fourth current is equal to a ratio of the third current gain to the second current gain.

4. The imaging system of claim 1, wherein the current mirror is further configured to generate the third current by amplifying the fourth current.

5. The imaging system of claim 1, wherein:
the transconductance amplifier is further configured genererate the second current according to a difference between the pixel voltage and the reference voltage.

6. The imaging system of claim 1, wherein:
the detector includes a plurality of pixels arranged in a matrix;

the charging unit includes a plurality of first transistors, each of which is coupled to a corresponding pixel in the matrix;

the reference unit includes a plurality of second transistors, each of which is coupled to a corresponding column of pixels in the matrix; and the output unit includes a plurality of third transistors, each of which is coupled to a corresponding column of pixels in the matrix.

7. The imaging system of claim 6, wherein each pixel includes:

a photodiode for detecting light or radiation;

a buffer amplifier coupled to the photodiode;

a first switch for selectively coupling a control node of a corresponding first transistor to a corresponding second transistor; and a second switch for selectively coupling a corresponding buffer amplifier to the transconductance amplifier.

8. The imaging system of claim 7, wherein each pixel further includes:

a third switch coupled to a corresponding second transistor for draining a charge which builds up on a control node of the corresponding second transistor when de-selected.

9. The imaging system of claim 1, wherein:

the detector includes a plurality of pixels arranged in a matrix;

the charging unit includes a plurality of first transistors, each of which is coupled to a corresponding pixel in the matrix;

the reference unit includes a plurality of second transistors, each of which is coupled to a corresponding pixel in the matrix; and the output unit includes a plurality of third transistors, each of which is coupled to a corresponding column of pixels in the matrix.

10. The imaging system of claim 9, wherein each pixel includes:

a photodiode for detecting light or radiation;

a buffer amplifier coupled to the photodiode;

a first switch for selectively coupling a control node of a corresponding first transistor to a corresponding second transistor; and a second switch for selectively coupling a corresponding buffer amplifier to the transconductance amplifier.

11. The imaging system of claim 10, wherein each pixel further includes:

a third switch coupled to a corresponding second transistor for draining a charge which builds up on a control node of the corresponding second transistor when de-selected.

12. An imaging method, comprising:

storing data representative of an amount of light or radiation in a detector;

detecting a pixel voltage of the detector;

generating a first current according to a difference between the pixel voltage and a reference voltage;

generating a second current according to the first current for charging the pixel, wherein the first current gradually decreases as the pixel voltage approaches the reference voltage;

generating a third current by amplifying the first current; and generating an output signal according to the third current.

* * * * *